March 10, 1964 R. RADKE 3,124,502
COMPOSITE FIBROUS LUBRICANT PACKING
Filed Aug. 18, 1958

INVENTOR
Rudolf Radke
BY Connolly and Hutz
ATTORNEYS

3,124,502
COMPOSITE FIBROUS LUBRICANT PACKING
Rudolf Radke, Frankfurt am Main Eschersheim, Germany, assignor to Frankfurter Asbestwerke Paul Kind Kommandit-Gesellschaft, Frankfurt am Main, Germany, a company of Germany
Filed Aug. 18, 1958, Ser. No. 755,657
2 Claims. (Cl. 161—182)

Some known stuffing box packings are manufactured from paper-like fibrous foils or fleeces, more particularly with asbestos as the fibrous material, and from bonding agents of known types, by a method in which the paper or the fleece or the foil is rolled up to a firmly coherent glued hollow cylinder whose inside and outside diameters are approximately equal to the corresponding dimensions of the stuffing box. From this roll, portions are cut off of suitable length such that they completely fill the depth of a stuffing box. These lengths of tubular material are then impregnated with an adhesive such as glue, rubber solution or like substance, and graphited on their outside. The graphited sleeves are then upset in a press tool, accordion fashion, the die having the exact inside and outside diameters of the stuffing box, so as to provide a firm and smooth stuffing box packing. Due to the previous graphiting the whole surface is thereby coated with a thin film of graphite.

Such packings, which generally have a base of glued paper, are not particularly resistant against steam or water and other liquids.

The thin film of graphite on the surface wears off after a relatively short time, and the exposed dry fibers will then cause very considerable friction.

For these reasons the useful life of such packings is often very short and they are of poor quality.

According to other methods, thin plastic or rubber bonded fibrous foils containing some added graphite have been manufactured on calenders. But for technical reasons the proportion of graphite in these materials can in general not exceed 20% and in no case 50%. Rolled stuffing box packings made in this manner are rather hard and do not possess good sliding properties due to the comparatively low graphite content.

It has now been found that stuffing box packings having a longer service life and improved sliding properties can be manufactured by punching an annular packing out of a sheet of a cardboard-like substance containing a fibrous material in which every single fibre is enclosed practically completely in a finely divided solid lubricant. By this method the proportion of graphite or other like lubricating solids can be increased to 80 to 90%.

These sheets of cardboard-like substance can be produced in several different ways usual in the paper and cardboard industry. For example a pulp prepared from fibrous materials containing the above solid lubricants can directly be processed on one of the known machines, for example an endless wire cardboard machine, to produce the cardboard sheets; or a number of thin paper-like foils can be made from the fibrous pulp, which are then joined together to form a thicker sheet out of which the stuffing box packings are punched. The essential feature is always that the fibrous pulp shall contain the finely divided solid lubricants in such a manner that practically every single fibre is completely enveloped in them; the pulp is then made into thin foils or thicker board in the usual manner practised in the paper and cardboard making industry. A number of thinner layers such as are used for building up thicker boards are preferably manufactured by board machines. For this process a number of layers are superimposed one upon the other, thereby forming a cylinder which is then cut open and removed. This process is followed by drying, after which the annular packings are punched out of the boards.

The pulp can be composed of a wide variety of materials, consisting both of organic and of inorganic fibres. Amongst the inorganic fibres asbestos is the most important material; but glass fibres, glass wool and like materials can also be used. The organic fibres comprise both animal fibres such as wool, and vegetable fibres such as cotton, jute and so on, and synthetic fibres made of regenerated cellulose, polyamides, fluorinated hydrocarbons, polyvinyl chloride etc. Amongst the solid lubricants graphite is the most important; other suitable materials are talc, mica, molybdenum disulphide and also metals in finely powdered form which are sufficiently ductile to assume the form of minute flakes under the forces arising in practice and which in this state help in improving the sliding and lubricating properties of the packings.

It is of course also possible to use mixtures consisting of several of these substances, both for the fibrous materials and for lubrication. The packings are also made more durable if one or more bonding agents are used in the manufacture of the cardboard sheets.

These bonding agents can be used in various different forms: as liquids, melts, solutions, emulsions, lattices, and suspensions. Possible materials for this purpose are: natural and synthetic rubbers, e.g. polymers and copolymers of isobutylene, ethylene, styrene and their homologues; polyvinyl chloride, polyvinyl ether, polyvinyl acetates, polyvinyl alcohols; polyacryl nitrile, polyacryl esters, polyacryl amides, polyurethanes, polycaprolactames; polymers of adipic acids and their derivatives; isocyanates; polyesters; terephthal acid resins; halogenated plastics, in particular those containing fluorine; phenol, cresol and other condensation resins; silicon resins and rubbers; animal, vegetable and synthetic glues; inorganic bonding agents such as water glass and others.

The natural and synthetic rubbers or cellulose acetate or other organic synthetic materials can for example be dissolved in suitable solvents or they can be used as emulsions, for example as latex of natural or synthetic rubber in an aqueous medium, or as emulsions of organic adhesives such as polyvinyl acetate.

One method of enveloping fibres with graphite or similar solid lubricants and of fixing the latter in position would be to process the fibrous materials with powdered graphite or another solid lubricant and an adequate quantity of latex according to one of the methods usual in the paper-making industry (in a pulp engine), i.e. with the addition of a quantity of water equal to about 10 to 100 times the volume of solid materials; the fibres will then be enveloped with graphite or a like substance. The actual quantity of water may differ according to the condition of the fibres. Basically the amount of water should increase with increasing proportion of fibrous material in the mixture. In order to improve the adhesion of the graphite to the fibres the latex can be coagulated by the addition of a coagulant, e.g. a trace of acid. If asbestos fibres are used, such coagulants are not in general required, however. In special cases it is of course also possible to work with other liquids in the place of water in the pulp engine, for example organic solvent, if necessary with substances like bonding agents dissolved in them. The mixture is then made into paper-like foils on the endless wire or the board machine; after drying they are again cut up into fibres by means of a devilling machine or similar appliance. It is also possible to treat the fibres with a spray dried which leaves the fibres nearly dry but coated with the solid particles of the lubricant. In each case every single fibre is then practically completely enveloped in graphite.

It is also possible first to coat the fibres with a thin layer of the bonding agent and then to apply the lubricant by dusting, blowing or mechanical stirring. It is also possible to spray asbestos or like fibres with a suspension of graphite or similar additives having a lubricating action and solutions or dispersions of bonding agents whilst the fibres move over heated surfaces. During this process the solvent or dispersing agent evaporates, leaving again dry individual fibres each of which is enveloped completely in the solid lubricant. It is also possible to apply the solid lubricant by applying these solid particles to the fibres, which have previously been treated with the bonding agent, under the action of an electrostatic field.

The impregnated fibres can be still moist or they can be more or less dry so that the solvents contained in the solution of bonding agent or the other phase contained in the emulsion of bonding agent, e.g. water, has been removed to a greater or lesser extent. The essential feature is that the fibres shall covered with a layer of bonding agent such that the particles of lubricant which are applied mechanically or electrostatically are held in a layer of the right consistency and thickness to envelop the fibres all round.

It is also possible to apply the solid lubricants and bonding agents to the fibres by preparing a dispersion consisting firstly of solutions of the bonding agents or emulsions and secondly of the solid additives with the lubricating properties, and intimately intermixing this dispersion—e.g. a pulp or sludge—with the fibres by immersion, stirring, kneading or spraying.

If these mixtures mentioned above, consisting of fibrous materials, solid lubricants in powder form and preferably also bonding agents, are to be processed according to the methods used in the paper and cardboard making industries it will of course be necessary to add enough water and make the mixture sufficiently fluid so that it can be worked on the usual paper and cardboard machines. It may be that quite considerable amounts of water are required for this purpose.

It may also be useful to treat the mixture with certain other chemicals to improve its chemical, physical or mechanical properties, such as silicon resins, fluorinated plastics and similar materials, particularly with additives improving the resistance of the packings against ordinary water, boiler feed water, sea water, acids, lyes or bases, salt solutions, gases, oils, inorganic or organic solvents or their mixtures, foodstuffs, medicine and like liquids. These special additives can either be added to the mixtures before they are made into fibrous boards, or to the finished boards, or even to the punched annular packings. These additives can also be used as solutions or in molten condition to impregnate the material.

The packings according to the invention can be further improved by subjecting the plates to high pressure before the rings are punched out, or by subjecting the rings to pressure after punching. The press tools employed for applying pressure to the rings after punching can be suitably shaped to produce rings of special cross sections, such as circular or elliptical cross sections, square cross sections standing on one corner, U-shaped, V-shaped, inverted V, and L-shaped sections (cp. German Standard DIN 3750 No. 2,2), sleeves and annular seals, which make good contact with the sliding surfaces due to their particular shape and also due to spring pressure, or also rhomboid and trapezoidal cross sections and similar sections. The annular packings can be fitted more easily on shafts or movable links if they are slotted or cut; the slots or cut surfaces may have a radial or tangential direction. The cuts can also be V-shaped or stepped, which helps in obtaining a good seal after these slotted rings have been fitted.

Below, the essential features of the invention are illustrated by reference to some mixtures whose compositions are given, and the shapes of some packing are shown by reference to the accompanying drawing.

Mixture Example 1

| | |
|---|---|
| Asbestos fibre | 24.00 parts. |
| Natural graphite | 70.00 parts. |
| Zinc white | 0.25 part. |
| Sulphur | 0.15 part. |
| Mercapto benzothiazole | 0.03 part as accelerator. |
| Rubber latex (60%), dry | 5.00 parts = 8.35 parts wet latex + 8.35 parts water. |
| Also alum solution (10%) | 0.57 part = 5.7 parts 10% solution. |
| | 100.00 parts. |

Mixture Example 2

| | |
|---|---|
| Chrysotil asbestos fibre | 30 parts. |
| Molybdenum disulphide | 20 parts. |
| Polytetrafluorine ethylene dispersion, of which dry (60%) | 20 parts = 33 parts wet dispersion + 33 parts water. |
| | 100 parts. |

Mixture Example 3

| | |
|---|---|
| Long cellulose staple fibre | 18 parts. |
| Mica | 30 parts. |
| Talc | 42 parts. |
| Polyvinyl chloride emulsion (50%), of which dry | 10 parts = 20 parts emulsion + 20 parts water. |
| Also | |
| | 100 parts. |

The mixtures prepared according to these examples are processed according to the methods described above, for example they are made into corresponding boards by the methods used in the paper cardboard industry, for example on endless wire or board machines. After these boards have dried and, if required, been subjected to pressure the packing rings are punched out of them. The punched rings can also be subjected to pressure afterwards by the application of suitably shaped press tools; they can also be slotted or cut; and they can be impregnated with fats or other known substances, either after they have been cut, or before they have been punched out.

A number of annular stuffing box packings according to the invention are illustrated on the accompanying drawings, in which FIG. 1 shows an annular packing 1, the cross section of the ring 1 being approximately square;

Figure 1:
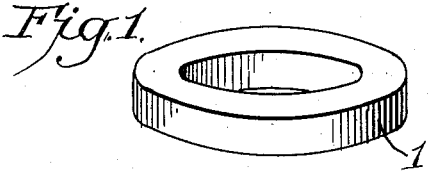
Figure 2:
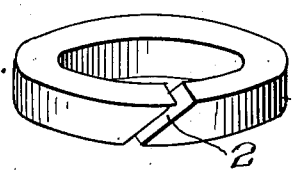
FIG. 2 shows a packing of the same cross section, but provided with an oblique radial cut 2.
Figure 3:
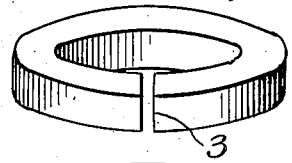
FIG. 3 shows again a radial cut 3, which here, however, is not oblique but axial.
Figure 4:
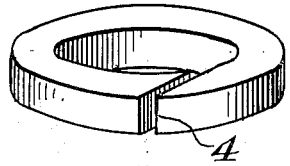
FIG. 4 shows a tangential cut 4.
Figure 5:
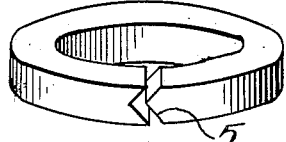
FIG. 5 shows again a ring with a radial cut 5, which is V-shaped when viewed from outside.
Figure 6:
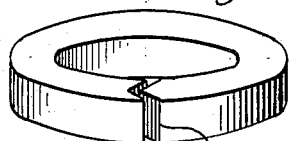
FIG. 6 shows again a V-shaped cut 6 seen axially.
Figure 7:
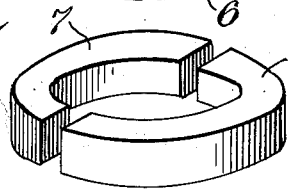
Figure 8:
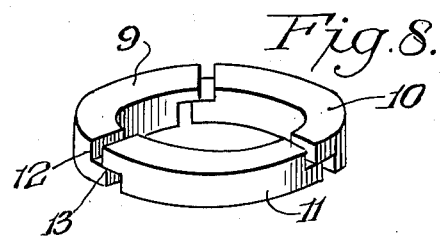

The packing shown in FIG. 1 can also be divided into a number of sections 7 and 8 by radial cuts (FIG. 7);

FIG. 8 shows a ring divided into 3 sections 9, 10 and 11. The cuts separating the sections are stepped so that the vertical faces 12 and the horizontal face 13 form a step.

Figure 9:
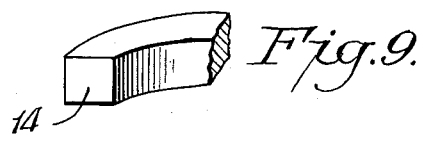
Figure 10:
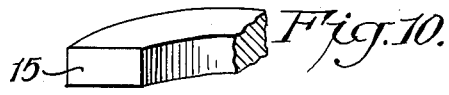
Figure 11:
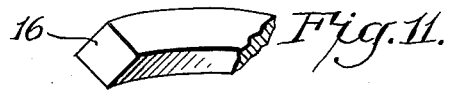
Figure 12:
Figure 13:
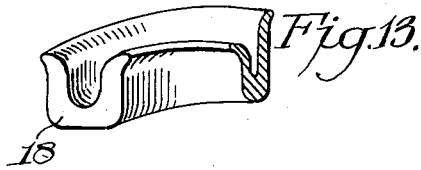
Figure 14:
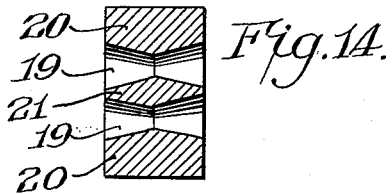

FIGS. 9 to 13 show various cross sections of the punched rings:

FIG. 9 shows a ring having a square cross section 14;

FIG. 10 shows a rectangular cross section 15;

In FIG. 11 the cross section is a square standing on one corner; and in FIG. 12 the cross section is circular. The section can also be V or U-shaped, as shown at 18 in FIG. 13, or it can be trapezoidal as at 19 in FIG. 14. This trapezoidal shape 19 allows a number of such packing rings to be assembled together with suitably shaped metal rings 20 and 21; the metal ring 21 has an approximately rhomboid cross section and the metal rings 20 have rectangular cross sections chamfered on one side. Such assemblies of packing rings 19 with metal rings 20 and 21 produce special packings particularly suitable for seals in which high simultaneous mechanical strength in an axial direction is required.

It must be understood that there are also various other possible embodiments of the method of manufacture of the fibrous materials shown here, of the method of manufacture and the substances used and of the shape of the packings.

The above description is therefore not intended to limit the invention; instead, the protection applied for for the invention is determined solely by the following patent claims.

I claim:

1. An annular stuffing box packing comprised of an impregnable punched out solid section made up of a plurality of thin sheets made up of fibers, said fibers having the orientation of fibers in paper, at least 70% by weight of finely divided solid lubricants incorporated in the fibrous material, each single fiber having a coat of finely divided solids held in a layer completely enveloping said fiber with said lubricants, said fibers being in defined position with relation to said lubricants and said sheets being combined and solidified to form the solid section punched out of said sheets.

2. An annular stuffing box packing comprised of an impregnable punched out solid section substantially free from moisture made up of a plurality of thin sheets of fibers from fibrous material, said fibers having the orientation of fibers in paper, a layer of a bonding agent covering each of the oriented fibers, at least 70% by weight of said solid section being finely divided solids having lubricating properties selected from the group consisting of graphite, molybdenum disulfide, mica and talc, each single fiber having a coat of said finely divided lubricants held in the layer of a bonding agent completely enveloping said fibers, said fibers being in defined position with relationship to said lubricants and said sheets being combined and solidified to form the solid section punched out of said sheets.

References Cited in the file of this patent

UNITED STATES PATENTS

| | | |
|---|---|---|
| 208,419 | O'Meara | Sept. 24, 1871 |
| 366,341 | Morrow | July 12, 1887 |
| 463,531 | Missel et al. | Nov. 17, 1891 |
| 746,143 | Peacock | Dec. 8, 1903 |
| 1,018,138 | Stanley | Feb. 20, 1912 |
| 1,398,439 | McMaster | Nov. 29, 1921 |
| 1,956,053 | Tucker | Apr. 24, 1934 |
| 1,979,977 | Martin | Nov. 6, 1934 |
| 2,021,571 | Victor et al. | Nov. 19, 1935 |
| 2,052,151 | Van Voorhis | Aug. 25, 1936 |
| 2,210,748 | Bernstein | Aug. 6, 1940 |
| 2,282,466 | Etzkorn | May 12, 1942 |
| 2,397,618 | O'Connor | Apr. 2, 1946 |
| 2,427,636 | Vaughan | Sept. 16, 1947 |
| 2,601,114 | Gillespie | June 17, 1952 |